Aug. 26, 1952     P. D. McAULIFFE     2,608,044
LAWN EDGE TRIMMER

Filed Dec. 24, 1949     2 SHEETS—SHEET 1

INVENTOR.
Patrick D. McAuliffe
BY
John Flam
ATTORNEY

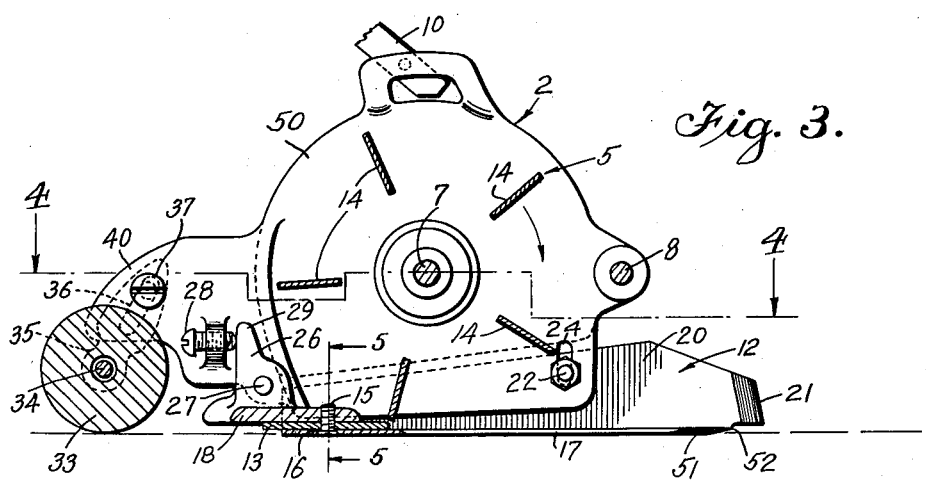
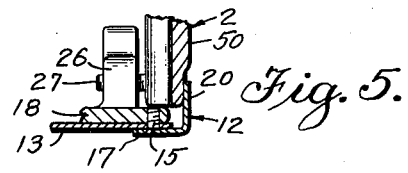
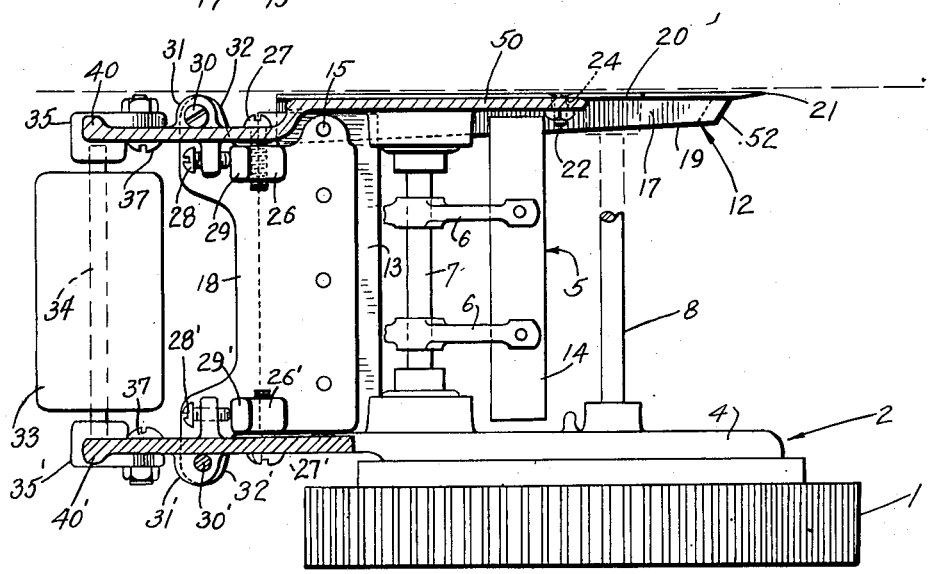

Patented Aug. 26, 1952

2,608,044

UNITED STATES PATENT OFFICE 2,608,044

LAWN EDGE TRIMMER

Patrick D. McAuliffe, Los Angeles, Calif.

Application December 24, 1949, Serial No. 134,890

10 Claims. (Cl. 56—251)

This invention relates to lawn edge trimmers of the type in which a rotary lawn mower cutter is used.

This application is a continuation in part of an application filed on June 17, 1948, in the name of Patrick D. McAuliffe, under Serial No. 33,580, now abandoned, and entitled: Lawn Edger and Trimmer.

In the conventional lawn mower utilizing a rotary cutter, the mower is provided at each side with a ground-engaging wheel. The two wheels serve to support the mower on the ground. In view of the fact that these wheels are of necessity spaced laterally from the ends of the blades of the rotary cutter, such lawn mowers are not capable of trimming the lawn right next to a corner as along a wall.

Special edgers or trimmers have been designed for cutting the grass close to the edge of a walk or wall, but they either dig into the lawn, or merely reduce the width of the uncut strip.

It is one of the objects of this invention to provide a simple and efficient edge trimmer capable of cutting the grass quite closely to the edge.

It is customary to adjust the height of the cutter blades above the ground by adjusting the position of a rear ground-engaging roller that extends laterally of the mower. To facilitate such adjustment, the roller shaft is rotatably supported on brackets mounted on the mower frame. This mounting of the brackets is adjustable.

It is another object of this invention to simplify the structure of the mower by making it possible to use identical brackets for both sides of the roller.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings.

Figure 1:
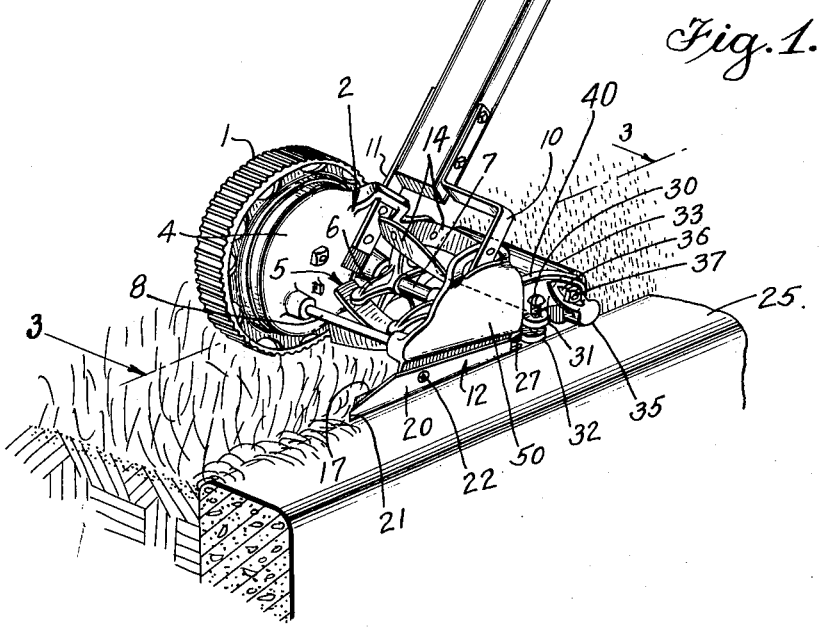
Figure 1 is a pictorial view of a lawn trimmer embodying the invention and shown in use.

Fig. 3 is a sectional view taken along a plane corresponding to line 3—3 of Fig. 1; the plane of the section passing between the casing 4 and frame member 50;

Fig. 4 is a sectional view taken along a plane corresponding to line 4—4 of Fig. 3; and Fig. 5 is a detail sectional view taken along a plane corresponding to line 5—5 of Fig. 3.

As shown most clearly in Fig. 1, the lawn trimmer includes a ground-engaging wheel 1 disposed at one side of a frame 2. On the inside of the wheel 1 the frame has a conventional casing 4 which serves to house a drive for the rotary cutter member 5. The wheel 1, in moving over the ground, thus serves to drive this cutter. This cutter member 5 may include a plurality of inclined blades 14 mounted on spiders 6 (see also Fig. 4) attached to a cutter shaft 7. This cutter shaft 7 extends into the gear casing 4. One or more struts 8 may extend between the casing 4 and the other side 50 of frame 2. A handle 9 of conventional design is pivotally mounted on the frame 2 by the aid of the straps 10 and 11.

The trimmer is supported on the ground at the side 50 opposite the ground-engaging wheel 1, by the aid of a guide member or runner 12. This guide member also serves to guide the grass at a lawn edge toward the cutters, as will be described hereinafter. It is supported on the lower surface of a stationary blade 13. This stationary blade 13, as shown most clearly in Fig. 3, has a forward edge cooperating with the blades 14 for cutting the grass.

In order to support the guide member 12 on the member 13, use is made of a screw 15 (Figs. 3, 4 and 5) that passes through an aperture 16 (Fig. 2) in the flat flange 17 of the member 12. This screw also passes through the blade 13 and is threaded into the support 18 to which the blade 13 is attached.

Figure 2:
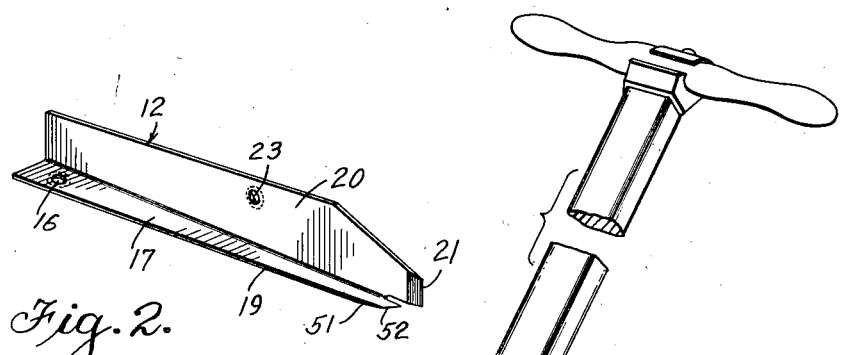
Fig. 2 is an isometric view of a guide embodying the invention.

As shown most clearly in Fig. 2, the flange or flat member 17 contacts the ground and glides over it as the trimmer is moved by the aid of the handle structure 9. The inner edge 19 of this member 17 is inclined as shown most clearly in Fig. 4 so that the forward end is narrower than that end which is attached to the blade 13. Furthermore, the lower surface of this forward end is beveled, as indicated at 51 (Fig. 2). In this way, there is no tendency for the member 12 to dig into the ground.

Extending upwardly from the outer edge of flat member 17 is a vertical wall 20. The forward edge 21 of this vertical wall 20 extends beyond the forward end of the member 17. This forward edge likewise may be beveled on that side facing the flange 17.

Further to support the member 12, a bolt 22 passes through an aperture 23 in the wall 20 and through a slot 24 of the end 50. The wall 20, as shown most clearly in Figs. 1 and 5, contacts the outer surface of the frame member 50. The lower portion of the frame member 50 is slightly depressed to accommodate the wall 20. Thus the outer surface of this wall is substantially flush with the surface of frame member 50. Accordingly this wall 20 and frame member 50 can be placed quite close to a vertical surface such as the vertical surface of a curbing 25 as shown in Fig. 1 or the vertical surface of a wall.

As the trimmer is moved in a forward direction by the aid of the handle 9, the grass near the edge is guided by the forward end and the inclined edge 19 of the member 12 toward the cutting blades 13 and 14. The beveled edge at the forward end of the wall 20 insures that the grass growing adjacent to a wall will be bent inwardly to be acted on by the grinding edge 19. To enhance this effect, the forward end 52 is inclined toward the rear.

The supporting member 18 for the blade 13 is shown as pivotally mounted by the aid of the ears 26 and 26' on the screws 27. These screws are supported on the frame 2. In this way the position of the forward cutting edge of the blade 13 can be adjusted with respect to the blades 14. In order to maintain this adjustment use is made of the screws 28 and 28' operating on the upwardly extending extensions 29 and 29' of the brackets 26 and 26'. These screws 28 and 28' prevent counter-clockwise rotation of the brackets 26 and 26'. Screws 30 and 30' (see also Fig. 1) are threaded in the ears 31 and 31' formed integrally with the frame members 4 and 50 and engaged with the upper surface of ears 32 and 32' formed at the rear side of the support 18. These screws 30 and 30' prevent clockwise movement of the brackets 26 and 26'. The slot 24 through which the screw 22 passes is provided in order to permit adjustment of the bracket 26.

A ground-engaging roller 33 is provided which is supported rearwardly of the frame 2. This roller is intended to rotate freely on the rod or shaft 34. This shaft 34 is mounted upon bearing brackets 35 and 35' at each end of the frame 2. Each of these brackets has an elongated slot, such as 36 (Fig. 3). Each of the brackets 35 and 35' is symmetrical with respect to the longitudinal axis of the corresponding slot 36.

A bolt 37 or 37' passes through each slot and an aperture in the ear 40 or 40'. By the aid of the slots 36 the position of the roller 33 may be adjusted. This roller determines the height of the cutter above the ground. Since each of the brackets 35 and 35' are symmetrical with respect to an axis passing centrally in a longitudinal direction of the corresponding slot 36, these brackets may be used interchangeably with both the right and left hand side of the apparatus.

The lawn edger is especially useful in connection with trimming grass around sprinkler heads, trees or the like. In this way it eliminates the hand work that otherwise would be required for this purpose. Furthermore, the edger not only trims around walls but also edges in the same operation.

The inventor claims:

1. In a lawn trimmer: a frame; a rotary cutter supported by the frame; a ground-engaging wheel adjacent one side of the frame and serving as a support for the frame on the ground; and a guide supported adjacent the other side of the frame; said guide having a lower surface adapted to glide over the ground, as well as a wall extending upwardly from the outer edge of said surface; the forward end of said guide extending in advance of the rotary cutter.

2. In a lawn trimmer: a frame; a rotary cutter supported by the frame; a ground-engaging wheel adjacent one side of the frame and serving as a support for the frame on the ground; and a guide supported adjacent the other side of the frame; said guide having a flat member having a ground-engaging surface adapted to glide over the ground and to support the frame on the ground; the forward end of the member being in advance of the rotary cutter; said guide also having a wall extending upwardly from the flat member; the ground-engaging surface of the member at the forward end being of less width than the rear end.

3. In a lawn trimmer: a frame; a rotary cutter supported by the frame; a ground-engaging wheel adjacent one side of the frame and serving as a support for the frame on the ground; means having a non-rotary cutting edge cooperating with the rotary cutter; and a guide supported on the said means and extending forwardly of the cutter; said guide having a flange adapted to glide on the ground for supporting the frame; said flange having a forward end narrower than the end adjacent said cutting edge; said guide also having a wall extending upwardly from said flange and at the outer edge of said flange.

4. In a lawn trimmer: a frame; a rotary cutter supported by the frame; a ground-engaging wheel adjacent one side of the frame and serving as a support for the frame on the ground; and a guide supported adjacent the other side of the frame; said guide having a lower surface adapted to engage and to glide over the ground as well as a wall extending upwardly from the outer edge of said surface; the forward end of said guide extending in advance of the rotary cutter; the forward end of the lower or ground-engaging surface being bevelled to provide a decreased thickness at the edge of said forward end of the lower surface, and the forward edge of the wall also being bevelled on the inner side to provide a decreasing thickness of the edge of said wall.

5. In a lawn trimmer: a frame; a rotary cutter supported by the frame; a ground-engaging wheel adjacent one side of the frame and serving as a support for the frame on the ground; and a guide supported adjacent the other side of the frame; said guide having a flat member adapted to glide over the ground and to support the frame on the ground; the forward end of the member being in advance of the rotary cutter; said guide also having a wall extending upwardly from the flat member; the forward end being of less width than the rear end; the lower surface of the flat member being bevelled at the forward end to provide a decreased thickness at the forward edge of said flat member; and the forward edge of the wall being bevelled on the inner side to provide a decreased thickness of the edge of said wall.

6. In a guide member for a lawn trimmer: a flat member converging toward its forward end; and a wall connected to and extending above the flat member and having a front edge in advance of the flat member.

7. In a guide member for a lawn trimmer: a flat member converging toward its forward end; and a wall connected to and extending above the flat member and having a front edge in advance of the flat member; the lower surface of the flat member being bevelled near its forward end.

8. In a guide member for a lawn trimmer: a flat member converging toward its forward end; and a wall connected to and extending above the flat member and having a front edge in advance of the flat member; the lower surface of the flat member being bevelled near its forward end; said front edge being bevelled on the inner side facing the flat member.

9. In a lawn trimmer: a frame; a rotary cutter supported by the frame; a ground-engaging wheel adjacent one side of the frame and serving as a support for the frame on the ground; means having a non-rotary cutting edge cooperating with the rotary cutter; and a guide supported on the said means and extending forwardly of the cutter; said guide having a flange adapted to glide on the ground for supporting the frame; said flange having a forward end narrower than the end adjacent said cutting edge; said guide also having a wall extending upwardly from said flange and at the outer edge of said flange; the forward edge of the wall extending beyond the forward end of the flange.

10. In a lawn edger: a ground engaging wheel at one side of the edger; a runner at the opposite side of the edger, said runner and wheel serving as the support for the edger on the ground, said runner having a converging forward end and an upright flange connected to the runner; a cutter structure mounted between the wheel and the runner; and means for mounting the runner in a position forward of the cutter structure.

PATRICK D. McAULIFFE.

REFERENCES CITED

The following references are of record in the file of this patent:

UNITED STATES PATENTS

| Number | Name | Date |
|---|---|---|
| 1,079,587 | Anthony | Nov. 25, 1913 |
| 1,489,868 | Wahl | Apr. 8, 1924 |
| 2,483,292 | Miller | Sept. 27, 1949 |
| 2,490,171 | Swahnberg | Dec. 6, 1949 |